Dec. 6, 1927.
W. J. CLARK ET AL
1,651,376
CLAMP FOR DENTAL MOLDS
Filed May 6, 1927
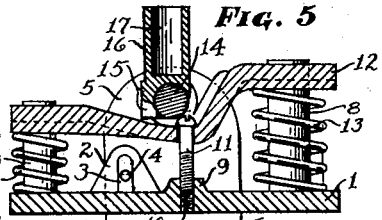
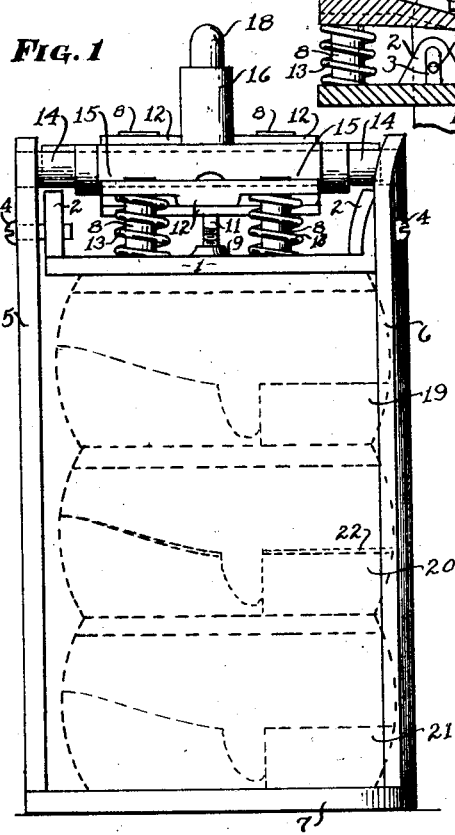
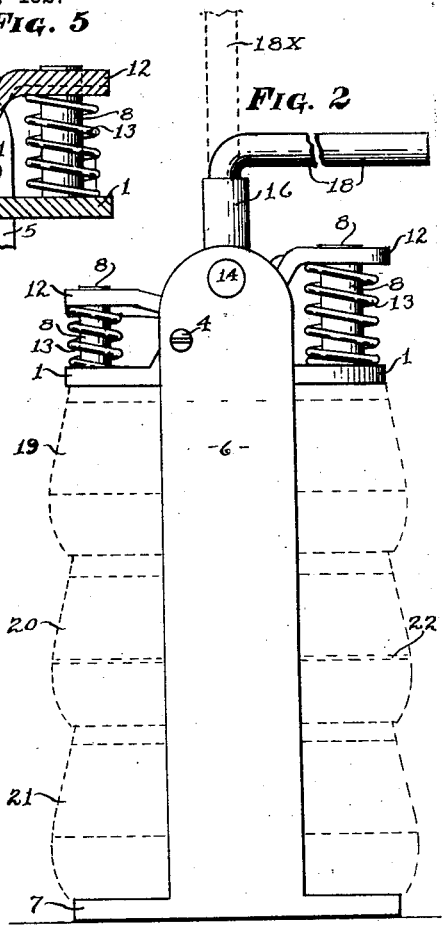
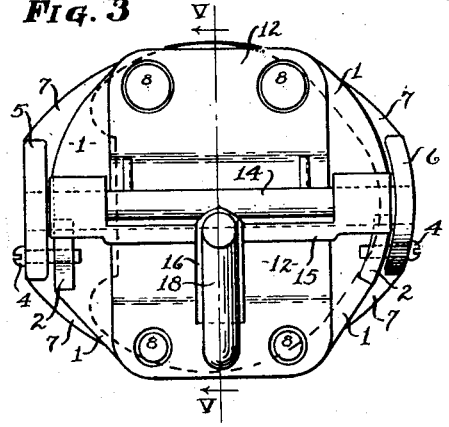
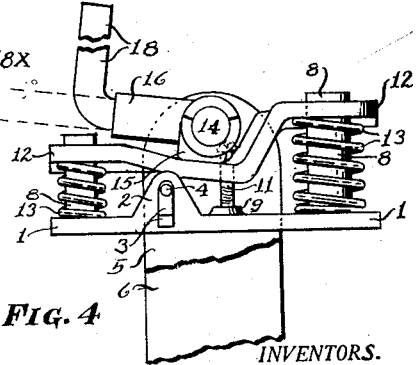
INVENTORS.
Walter J. Clark
William M. Romine
BY
ATTORNEY.

Patented Dec. 6, 1927.

1,651,376

UNITED STATES PATENT OFFICE.

WALTER J. CLARK AND WILLIAM M. ROMINE, OF WICHITA, KANSAS.

CLAMP FOR DENTAL MOLDS.

Application filed May 6, 1927. Serial No. 189,410.

Our invention relates to a clamp for dental molds.

The object of our invention is to provide a clamp for dental molds, that is quick in operation, positive in its work, and one that applies pressure to the molds evenly.

A further object of our invention is to provide a clamping means having a lever by which the eccentric or cam is operated and functions as a handle, the said handle being removable when the clamp is placed in the vulcanizing chamber.

These and other objects will hereinafter be more fully explained.

Referring to the drawings:

Fig. 1 is a front view of the clamp, with the flasks shown in dotted lines.

Fig. 2 is a side view of Fig. 1.

Fig. 3 is a plan view of Fig. 1.

Fig. 4 is the same view as Fig. 2, with one of the legs of the clamp broken off for convenience of illustration.

Fig. 5 is a sectional view of the clamping portion of the clamp, taken along the line V—V in Fig. 3.

The clamp is composed of a plate 1, having upwardly projecting ears 2, said ears provided with slots 3 to receive a screw 4 which is screwed through the legs 5 and 6, said screw acting as a retaining member to hold the plate 1 between the legs 5 and 6. The legs 5 and 6 are integral with a base member 7.

Integral with the plate 1 are four studs 8 projecting upwardly. On the plate 1 is a boss 9, through which an aperture 10 is drilled, and threaded to receive the screw 11. The form of plate 12 is shown in Figs. 4 and 5, the said plate is provided with apertures through which pass the studs 8 as guiding means therefor, and in the center is an aperture to receive the screw 11. Between the plates 1 and 12 and on each of the studs 8 are spiral springs 13 which tension the plates apart and the said screw 11 acts as an adjustment to gauge the maximum separation of the two plates 1 and 12. The rod 14 has its bearings in the upper ends of the legs 5 and 6, and on this rod is a cam shaped member 15 having an integral projection 16 which is socketed as shown at 17 for the purpose of receiving an actuating rod 18 having a right angle bend as shown in Figs. 2 and 4. The object of the bend in this rod is that when the clamp is in its compressed position, the rod functions as a handle by which the clamp and flasks may be lifted and placed in a container of water, after which the rod may be removed in order that the container may be sealed for heating purpose to vulcanize the rubber within the flasks. The said rod 18 will preferably be used with the straight end, (see dotted lines 18ˣ), inserted in the socket 17 for purposes of manipulating the clamp while the bent end of the rod will only be used as a handle as above described.

When the clamp is positioned as shown in Fig. 4, the plate 1 will rest on the top of the molds 19, 20 and 21. The cam 15 pressing down on the plate 12 engages the springs 13 between the two plates 12 and 1, the result of which is that the spring pressure is equally applied to the top of the flasks at the four points as shown by the studs 8.

During the process of vulcanizing, the rubber in the molds moves to imbed itself into the forms of the flasks, by which means the flask may be opened slightly as shown by the dotted lines 22, or should the flask be slightly open the pressure imposed thereon will cause it to close. The springs 13 compensate for this movement and always hold a pressure on the rubber while it is being vulcanized. When the clamp and flasks are to be removed from the vulcanizing chamber, the rod 18 is inserted in the opening 17 as heretofore described, functioning as a handle by which the heated flask may be removed.

Such modifications may be employed as lie within the scope of the appended claims.

Having thus described our invention, what we claim as new and desire to secure by Letters Patent is:—

1. In a clamp for dental molds, a base member having upwardly extending legs diametrically positioned thereto, an aperture in the upper ends of the legs, a plate having two slotted ears peripherally positioned, screws threadedly engaging through the legs and loosely engaging in the slots of the ears as pendent supporting means for the plate, a second plate positioned on the first said plate, springs between said plates, means to prevent said plates from separating, a rod trunnioned in the apertures of the legs, a cam like members mounted on said rod to engage on last said plate as compression means therefor to function as a clamp.

2. In a clamp for dental molds, a base member having upwardly extending legs peripherally and diametrically positioned, dental flasks positioned on the base member between the legs, two plates pendently supported near the upper ends of the legs, a plurality of springs positioned between the plates, a rod positioned in the upper ends of the legs, a cam like member rotatably mounted on said rod so it will engage on the top plate as tensioning means to compress the flasks, a socketed member centrally positioned on the rod, a handle having a right angle bend to engage in the socket as rocking means for the rod.

3. In a clamp for dental molds, a mechanism of the kind described, having a base member with diametrically positioned legs as a receiver for a plurality of dental forms, a plate to engage on the top of the forms having studs distributed and laterally extending therefrom, spiral springs positioned on the studs, a second plate having apertures to engage on the studs, a screw centrally positioned to loosely engage through an aperture in the last said plate and threadedly engage in the first said plate as means to hold said plates in contact, a rotatable cam member mounted on a rod, trunnioned in the upper ends of the legs, a socketed member integrally connected to the cam member, and a lever having a right angle bend to engage in the socket so that when the cam is rocked to engagement the lever functions as a handle for carrying the mechanism.

4. In a clamp for dental molds, a base member having a pair of legs peripheral and diametrically positioned and laterally extending therefrom, an aperture in the upper end of each of the legs, a plate having a stud positioned on the four corners and laterally extending from the plane thereof, a spiral spring positioned on each of the studs, a second plate having apertures in the corners thereof to slidably engage on the studs and resting on the springs, a screw centrally positioned and threadedly engaging in the first said plate, and an aperture in registry therewith in the last said plate so that the head of the screw will engage on the top of the plate as means to prevent separation of said plates, a rod trunnioned in the apertures of the legs, a cam member on the rod as compression means for the plates, a detachable handle for the cam member as actuating means therefor, all as, and for the purpose described.

In testimony whereof we affix our signatures.

WALTER J. CLARK.
WILLIAM M. ROMINE.